US010085502B1

(12) United States Patent
Trepanier

(10) Patent No.: US 10,085,502 B1
(45) Date of Patent: Oct. 2, 2018

(54) HANDS-FREE DOG CONTROL HARNESS

(71) Applicant: Tye Joseph Trepanier, Oregon City, OR (US)

(72) Inventor: Tye Joseph Trepanier, Oregon City, OR (US)

( * ) Notice: Subject to any disclaimer, the term of this patent is extended or adjusted under 35 U.S.C. 154(b) by 0 days.

(21) Appl. No.: 15/491,970

(22) Filed: Apr. 19, 2017

(51) Int. Cl.
*A41F 9/02* (2006.01)
*A01K 27/00* (2006.01)

(52) U.S. Cl.
CPC ............ *A41F 9/025* (2013.01); *A01K 27/003* (2013.01)

(58) Field of Classification Search
CPC .. A01K 27/008; A01K 27/003; A01K 27/005; A45F 3/02; A45F 2003/001; A45F 2003/003; A41F 9/025
See application file for complete search history.

(56) References Cited

U.S. PATENT DOCUMENTS

| | | | | |
|---|---|---|---|---|
| 2,333,488 A * | 11/1943 | Parth | ..................... | A01K 27/005 119/776 |
| 2,356,715 A * | 8/1944 | Webster | ............... | A01K 27/005 119/776 |
| 5,038,719 A * | 8/1991 | McDonough | ........ | A01K 27/003 119/772 |
| 5,718,189 A * | 2/1998 | Blake | ..................... | A01K 27/00 119/770 |
| 5,806,466 A * | 9/1998 | Pintor | ..................... | A01K 27/00 119/770 |
| 6,039,677 A * | 3/2000 | Spletzer | ............. | A63B 21/0605 2/22 |
| 6,192,835 B1 * | 2/2001 | Calhoun | ................ | A01K 27/00 119/792 |
| 6,450,129 B1 * | 9/2002 | Flynn | ..................... | A01K 27/00 119/770 |
| 7,766,203 B2 * | 8/2010 | Marinaj | .................... | A45F 5/00 224/232 |
| 2004/0194733 A1 * | 10/2004 | Bremm | ................ | A01K 27/003 119/770 |
| 2008/0133256 A1 * | 6/2008 | Speroni | ............... | A01K 27/006 705/1.1 |

(Continued)

FOREIGN PATENT DOCUMENTS

| CA | 2094176 A1 * | 1/1995 | ............. A01K 27/00 |
|---|---|---|---|
| CA | 2497385 A1 * | 8/2006 | ............. A01K 15/02 |

*Primary Examiner* — Magdalena Topolski
(74) *Attorney, Agent, or Firm* — Mohr Intellectual Property Law Solutions, P.C.

(57) ABSTRACT

A hands-free control harness for a dog while either running, jogging or walking with the animal securely controlled in a position to the wearer's side. This allows for full restraint of an animal accompanying a person and allowing for hands-free control of the animal to ensure point control, direction control, and full safety of the animal in a hands free manner. The device is comprised of an adjustable waist-mounted belt with an attached D-ring leash attachment member that provides for a non-movable connection point at the persons hip and a single adjustable leg-mounted belt attached via adjustable vertical straps, which restricts movement of the waist-mounted belt in either a clockwise or counterclockwise movement about the person. A common dog leash shall be used to attach from the D-ring leash attachment member to the dogs' collar, which will maintain the animal in a controlled healing position to the wearer.

4 Claims, 2 Drawing Sheets

(56) References Cited

U.S. PATENT DOCUMENTS

| 2010/0294821 A1* | 11/2010 | Szabo | A45F 3/00 |
| | | | 224/661 |
| 2015/0075448 A1* | 3/2015 | Clark | A01K 27/00 |
| | | | 119/797 |

* cited by examiner

HANDS-FREE DOG CONTROL HARNESS

BACKGROUND OF THE INVENTION

Field of the Invention

This invention relates to a method of hands-free control of a dog while either walking, jogging, or running with the animal. More specifically, the invention relates to a restraining device that allows the wearer to control a leashed animal at his or her side and at the same time leave the persons hands free to swing in a natural motion or to hold other items as needed.

Related Art

Many leash systems or hands-free harnesses have been developed that are waist mounted to reduce the need for holding a leash while walking, jogging, or running with a dog. Such articles are illustrated by: Brown (U.S. Pat. No. 5,161,486), Whitney (U.S. Pat. No. 6,932,027), McDonough (U.S. Pat. No. 5,038,719), Perrulli (U.S. Pat. No. 5,950,569), Calhoun et al. (U.S. Pat. No. 6,192,835), Pintor et al. (U.S. Pat. No. 5,806,466), Williams (Des Pat. No. D350,628), and Blake (U.S. Pat. No. 5,718,189).

Brown (U.S. Pat. No. 5,161,486), discloses an apparatus providing a two-point attachment of a leash to that of a belt worn by the user. The leash then connects to the dogs collar to restrain the animal while leaving the persons hands and arms free to swing naturally. The device comprises a waistband belt with one attachment hook on the left side and one attachment hook on the right side of the belt. A flexible cord is affixed to each of the attachment hooks and a modified lead is detachably hooked to the flexible cord. The modified lead connects to the animal with a quick-release clasp.

Whitney (U.S. Pat. No. 6,932,027), discloses a two-piece waist mounted harness with a back portion which is padded and can be secured with a hook and loop attachment. A nylon strap engages the entire circumference of the first and second portion of the waist harness to close and secure it. The waist harness includes multiple attachment loops to allow for carrying of additional pouches on the belt. The front portion of the waist harness is securable to a quick release snap mechanism that allows for engagement of multiple tethered pets for quick disengagement as necessary.

McDonough (U.S. Pat. No. 5,038,719), discloses a leash system in which one end of the leash hooks onto the dog collar D-ring, and the other end is permanently connected to a belt at a leash attachment point. The leash has a handle loop along the mid-section of the leash as well as two rings along the mid-section. One of the two rings may be places on a hook on the belt a fixed distance from the leash attachment point to shorten the leash while still attached to the dog to bring the animal up close to the user as needed. The other of the two rings may be used for attachment of a second leash for a second dog.

Perrulli (U.S. Pat. No. 5,950,569), discloses a dog leash belt that has a slide member formed from a length of flexible substantially non-stretchable material has two ends secured to the exterior surface of the belt. A slide member extends along a substantial length of the exterior surface of the belt in adjacent parallel relationship to the belt. A coupling member is mounted along the slide member. A leash can be connected to the coupling member and to the animal allowing the lead to slide substantial distance relative to the belt so that the animal can move from the 3 O'clock to the 9 O'clock position of the wearer.

Calhoun et al. (U.S. Pat. No. 6,192,835), discloses a pet leash system which includes a quick-connect/disconnect fasteners attached to a belt around the users waist, the belt to a leash, and the leash to a dog collar. There is a second attachment point that allows for storing the leash when not in use. Both of the leash attachment points on the belt are assemblies that may slide independently along the complete length of the belt to allow an animal to maneuver completely around the user. The quick-connect/disconnect feature of the fasteners allows for quick handling in an emergency.

Pintor et al. (U.S. Pat. No. 5,806,466), discloses a pet training device with a belt connected to a free moving strap that supports two thigh straps with a coupling mechanism attached to at least one strap. The coupling mechanism is then connected to the collar of a dog and provides an apparatus primarily developed for the purpose of training a pet, such as a dog, to heel.

Williams (Des Pat. No. D350,628), discloses a design for a dog leash and a belt, having a quick release buckle on the belt and a quick release connection between the leash and the belt. The leash connection to the belt appears to be on one side of the belt in a permanent or semi-permanent position.

Blake (U.S. Pat. No. 5,718,189), discloses a belt secured with a hook and loop fastener. The belt has two fixed attachment D-rings sewn into the belt. A loop at the front of the belt may be pulled by the user to quickly pull the belt off of the waist, so that the loop effectively becomes a leash handle and the rest of the belt dangles from the leash.

There is still a need for an effective hands-free dog control harness that is simple, lightweight, and easy to use. This Hands-free dog control harness will allow for complete hands-free use for serious running runners or the occasional walker/jogger who wants a pet to accompany them for exercise. The control harness will allow for quick and easy control of the animal, prevent unexpected injuries of the owner or the animal, and prevent the animal from running off if it becomes overly excited. This invented Hands-Free Dog Control Harness meets those needs.

SUMMARY OF THE INVENTION

People walking, jogging, or running with their dog typically restrain the animal with the use of a hand-held leash which can be inconvenient and difficult to handle during exercise. For example, the runner's rhythm can be disturbed, particularly if the dog crosses in front of the runners intended stride path and the use of a leash tends to inhibit the natural motion of the runners, joggers, or walkers arm swing during exercise. In another example, where a person were to walk a dog while pushing a baby stroller, it is difficult to manage a hand-held leash and it is dangerous to tie a leash onto the stroller. Any of these examples can become a safety hazard with an untrained or ill-tempered dog or if the dog becomes overly excited and attempts to suddenly run. This invention is intended to keep the animal in its full upright position, standing on all four legs and in the same parallel position of the user with the animal no farther forward than the users hip in what is understood as a "healing position" for a dog.

While in use of the apparatus, if the animal should pull forward the waist-mounted belt shall hold position due to the connection of the waist-mounted belt to the vertical retention straps that are further attached to a leg-mounted belt that is secured to the users thigh. The vertical retention straps are positioned at an angle from each other to prevent either clockwise or counter-clockwise rotation of the waist-mounted belt as the retention straps would be kept in place by their connection to the leg-mounted belt. The user can control the direction of the animal with a slight twist of the hips to give clarity of the wearer's intended direction of travel. In the event that the user has to quickly stop or retreat from their position, the animal will be immediately alerted to the change in direction and will be redirected to a safe position immediately next to the user. One might see such an action when stepping back onto a city curb to retreat from an unexpected on-coming vehicle.

The Hands-Free Dog Control Harness for hands-free control and restraint of an animal by a person while walking, jogging, or running, comprises the embodiment of a belt apparatus and a leg apparatus that work in tandem for hands-free control and restraint of an animal. The waist-mounted belt, to be positioned about the user's waist, has a waist-belt quick release buckle, to secure the belt around the user's waist. There is a belt slider adjuster for adjusting the length of the belt to allow for differing user waist sizes and comfort adjustment to ensure the waist-mounted belt can be securely fitted around the users waist. The leg-mounted belt, to be positioned about the user's upper thigh, has a leg-belt quick release buckle to secure the leg-belt around the user's thigh. There is a slider adjuster for adjusting the length of the leg belt depending on the circumference of the user's thigh.

Each vertical strap connecting the waist-mounted belt to the leg-mounted belt, has a vertical strap quick release buckle with a quick release buckle connector (female portion) and a pronged connector (male portion) that are established in an inverse direction from each other to help the user easily identify how to properly make the connections. The straps can then be pulled snug and the excess strap can be folded up and stuffed under the attached elastic bands to keep it secured.

The waist-mounted belt has a D-ring leash attachment member firmly attached to the left exterior side and rear position of the waist-mounted belt with the same material comprised of the belt to ensure limited horizontal or vertical movement of the D-ring leash attachment member. The D-ring leash attachment member is used for connecting the proximal end of an animals leash securely to the waist-mounted belt. The waist-mounted belt has two vertical retention straps attached by the proximal ends of each strap, to the waist-mounted belt at the wearer's right front location in a downward direction toward the thigh. Both straps have a vertical strap quick release buckle near the center portion of the vertical retention straps and also an elastic band to retain the excess vertical retention strap material. The distal ends of the vertical straps are connected to the leg apparatus which consists of a leg-mounted belt that is worn on the upper extent of the wearer's right thigh and is secured to the thigh with a leg-belt quick release buckle. The vertical retention straps are attached to the leg-mounted belt on either side of the leg-belt quick release buckle and are intended to help prevent clockwise or counter clockwise movement of the waist-mounted belt during use of the invention. The leg-mounted belt has a leg-belt slider adjuster attached to the leg-mounted belt at the wearer's front right position to allow for differing user thigh sizes and comfort adjustment.

The waist-belt quick release buckle is decomposed into two parts. On the first end of the waist-mounted belt there is a waist-belt quick release buckle connector (female portion) and on the second end of the waist-mounted belt there is a waist-belt quick release buckle pronged connector (male portion) so that the waist-mounted belt can be secured about the user's waist.

The leg-mounted belt is comprised of the leg-belt quick release buckle that is decomposed into two parts. On the first end of the leg-mounted belt there is a leg-belt quick release buckle connector (female portion) and on the second end of the leg-mounted belt there is a leg-belt quick release buckle pronged connector (male portion) so that the leg-mounted belt can be secured about the user's thigh.

The leg-mounted belt has a leg-belt slider adjuster located on the right front of the leg-mounted belt to remove slack. The distal ends of the vertical retention straps are attached to the leg-mounted belt, one attached on each side of the leg-belt quick release buckle in an upward position terminating at the waist-mounted belt to provide retention and restricted movement of the waist-mounted belt.

The first vertical retention strap is attached by the proximal end to the exterior of the waist-mounted belt and the second vertical retention strap is attached by the proximal end to the interior of the waist-mounted belt. The first vertical retention strap and the second vertical retention strap are set at an angular separation of between 20 to 60 degrees from one another. Each vertical retention strap are divided into two parts by a vertical strap quick release buckle with one half containing the vertical strap quick release buckle connector (female portion) and one half containing the vertical strap quick release buckle pronged connector (male portion). Each half of the vertical retention strap that contains the vertical strap quick release buckle pronged connector (male portion) also has the elastic band for excess vertical retention strap material storage.

The vertical strap quick release buckle on the first vertical retention strap is attached such that the male and female portions of the vertical strap quick release buckle are in opposite directions or positions of the vertical strap quick release buckle for the second vertical retention strap. For further clarity, the vertical strap quick release buckle on the first vertical retention strap has the vertical strap quick release buckle pronged connector (male portion) on the top and the vertical strap quick release buckle connector (female portion) on the bottom. In contrast, the vertical strap quick release buckle on the second vertical retention strap has the vertical strap quick release buckle pronged connector (male portion) on the bottom and the vertical strap quick release buckle connector (female portion) on the top. This ensures that the user can intuitively connect the leg-mounted belt to the waist-mounted belt without confusion. Both the first vertical retention strap and the second vertical retention strap can further be adjusted for lengthening and shortening the vertical retention straps to remove slack.

BRIEF DESCRIPTION OF THE DRAWINGS

Figure 1:
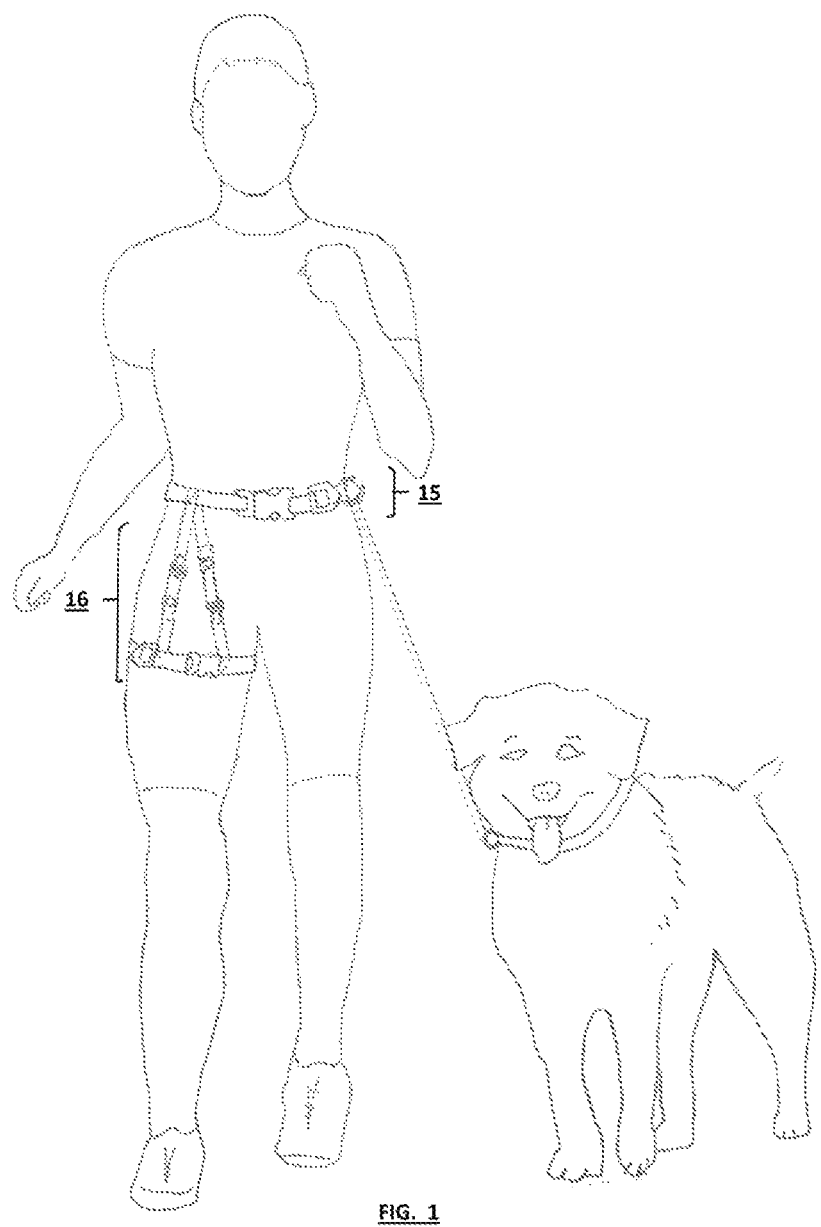

Having thus described various embodiments of the invention in general terms, reference will now be made to the accompanying drawings, which are not drawn to scale, and wherein:

FIG. 1: Illustrates a perspective view of one embodiment of the apparatus in use on a user's waist during a pet-owners run with a dog.

Figure 2:
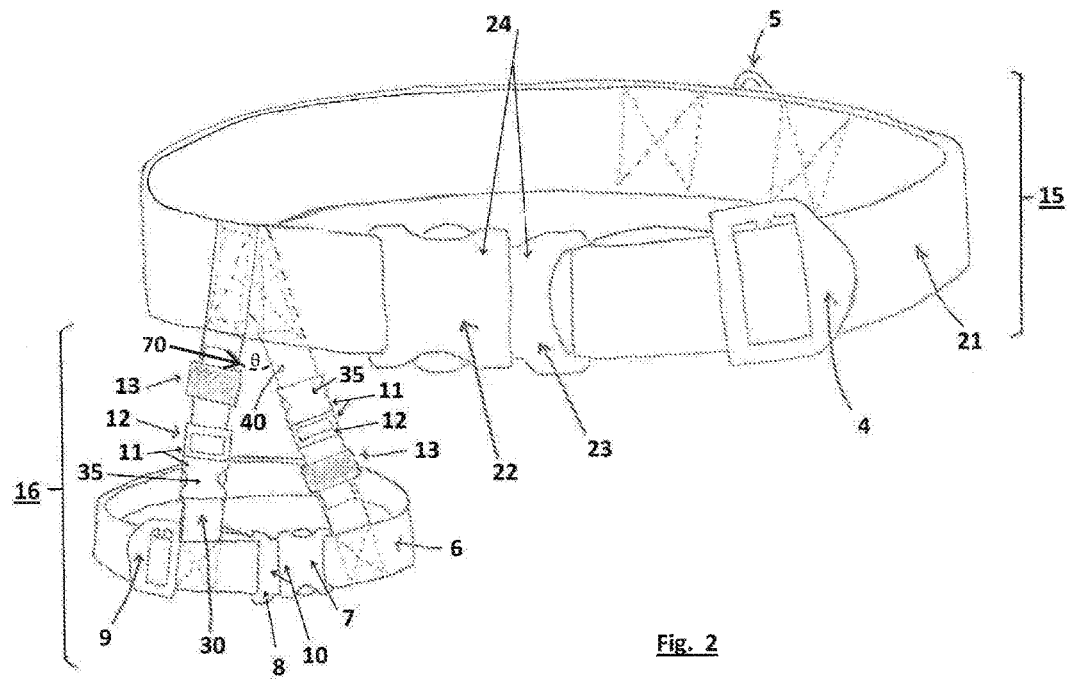

FIG. 2: Depicts the front elevation view of the entire apparatus being worn by the user in FIG. 1.

Figure 3:
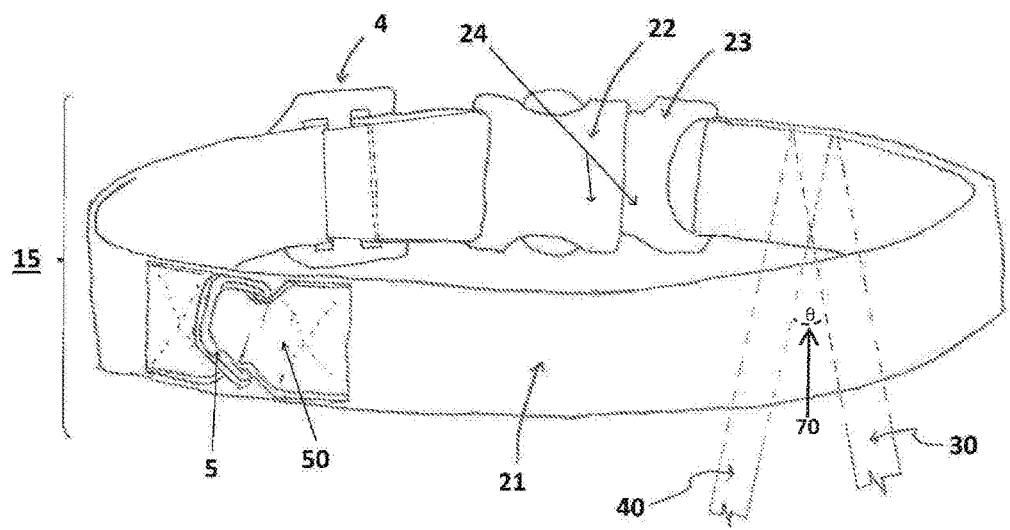

FIG. 3: Depicts the rear elevation view of the apparatus shown in FIG. 1 and FIG. 2 where we see only section 15 of the apparatus that is fully viewed in FIG. 2.

DETAILED DESCRIPTION OF THE OF THE INVENTION

Various embodiments of the invention are described more fully hereinafter with reference to the accompanying drawings of a Hands-Free Dog Control Harness for hands-free control and restraint of an animal by a person while walking, jogging, or running.

Referring to FIGS. 1, 2, and 3, a dog or other animal, is restrained by this invention 15, 16 and the use of a shortened common leash. The system includes a belt apparatus 15 and a leg apparatus 16 that work in tandem for hands-free control and restraint of an animal. The belt apparatus 15 consists of a waist-mounted belt 21 to be positioned about the user's waist with the waist-mounted belt 21 having a waist-belt quick release buckle 24 attached to join the ends and to secure the waist-mounted belt 21 around the user's waist.

There is a waist-belt slider adjuster 4 located on the front left position of the waist-mounted belt 21 to allow for differing user waist sizes and comfort adjustment depending on the circumference of the user's waist such that the waist-mounted belt 21 can be adjusted snuggly about the user's waist. The waist-mounted belt 21 has a D-ring leash attachment member 5 firmly attached to the left exterior side and rear position of the waist-mounted belt 21 for connecting the proximal end of an animals leash securely to the waist-mounted belt 21.

The waist-mounted belt 21 has a first vertical retention strap 30 and a second vertical retention strap 40 attached by the proximal ends of each strap to the waist-mounted belt 21 at the wearer's right front location in a downward direction toward the thigh. Both the first vertical retention strap 30 and the second vertical retention strap 40 each have a vertical strap quick release buckle 11 situated near the center portion of the vertical retention straps 30 & 40. Additionally, each of the vertical retention straps 30 & 40 has an elastic band 13 to retain the excess vertical retention strap material. Both the first vertical retention strap 30 and the second vertical retention strap 40 are connected at the distal ends to the leg-mounted belt 6 and at the proximal ends to the waist-mounted belt 21.

The leg apparatus 16 is comprised of a leg-mounted belt 6 that is worn on the upper extent of the wearer's right thigh and is secured to the thigh with a leg-belt quick release buckle 10. The first vertical retention strap 30 and the second vertical retention strap 40 are attached to the leg-mounted belt 6 on either side of the leg-belt quick release buckle 10.

The leg-mounted belt 6 has a leg-belt slider adjuster 9 attached to the leg-mounted belt 6 at the wearer's front right position to allow for differing user thigh sizes and comfort adjustment.

In further detail, the waist-belt quick release buckle 24 attached to the waist-mounted belt 21, is comprised of two parts, where the first end of the waist-mounted belt 21 has a waist-belt quick release buckle connector (female portion) 22 and the second end of the waist-mounted belt 21 has a waist-belt quick release buckle pronged connector (male portion) 23 so that the waist-mounted belt 21 can be secured about the user's waist. The waist-mounted belt 21 further comprises the waist-belt slider adjuster 4 located on the left front at the wearer's 10 to 11 o'clock position of the waist-mounted belt 21 to remove slack. The waist-mounted belt 21 has the D-ring leash attachment member 5 attached at the wearer's 7 to 8 o'clock position at the center width of the waist-mounted belt 21 material, and attached to the waist-mounted belt 21 by passing through the center of the D-ring leash attachment member 5, a section of the same material used for the waist-mounted belt 21 and securely attaching the pass-through material 50 (more easily seen in FIG. 3) back onto the waist-mounted belt 21 on both sides of the D-ring leash attachment member 5 to ensure limited horizontal or vertical movement of the D-ring leash attachment member 5 that is now trapped between the two attached ends of the pass-through material 50.

In further detail, on the waist-mounted belt 21 where the first vertical retention strap 30 and the second vertical retention strap 40 are attached by the proximal end of each to the waist-mounted belt 21 located at the wearer's 1 to 2 o'clock position in a downward direction to be further connected by the distal end(s) to the leg-mounted belt 6 to provide retention and restricted movement of the waist-mounted belt 21 during use of this Hands-Free Dog Control Harness.

In further detail, the leg-mounted belt 6 seen in FIG. 2 of the leg apparatus 16, is comprised of the leg-belt quick release buckle 10 that is decomposed into the first end comprising a leg-belt quick release buckle connector (female portion) 7 and the second end of comprising a leg-belt quick release buckle pronged connector (male portion) 8 so that the leg-mounted belt 6 can be secured about the user's thigh. Additionally, the leg-mounted belt 6 has a leg-belt slider adjuster 9 located on the right front at the wearer's 2 to 3 o'clock position of the leg-mounted belt 6 to remove slack based on the needed circumference such that the leg-mounted belt 6 can be adjusted snuggly about the user's thigh.

The leg-mounted belt 6 has the first vertical retention strap 30 and the second vertical retention strap 40 attached by the distal end(s) of each to the leg-mounted belt 6 with one attached on each side of the leg-belt quick release buckle 10 in an upward position, terminating at the waist-mounted belt 21, to provide retention and restricted movement of the waist-mounted belt 21 during the use of the Hands-Free Dog Control Harness.

In further detail of the vertical straps, wherein the first vertical retention strap 30 is attached by the proximal end to the exterior of the waist-mounted belt 21 and the second vertical retention strap 40 is attached by the proximal end to the interior of the waist-mounted belt 21. The first and second vertical retention straps 30 & 40 have an angular separation 70 between 20 and 60 degrees from one another. Furthermore, the first vertical retention strap 30 and the second vertical retention strap 40 are each divided into two parts by a vertical strap quick release buckle 11 further decomposed with one half containing the vertical strap quick release buckle connector (female portion) 35 and one half containing the vertical strap quick release buckle pronged connector (male portion) 12. Each half of the vertical retention strap that contains the vertical strap quick release buckle pronged connector (male portion) 12 also has an elastic band 13 for excess vertical retention strap material storage.

To ensure the user can intuitively connect the leg-mounted belt 6 to the waist-mounted belt 21 without confusion or difficulty, the vertical strap quick release buckle 11 on the first vertical retention strap 30 is attached such that the male and female portions of the vertical strap quick release buckle 11 are in opposite directions or positions of the vertical strap quick release buckle 11 for the second vertical retention strap 40 as seen in FIG. 2. For further clarity, the vertical strap quick release buckle 11 on the first vertical retention strap 30 has the vertical strap quick release buckle pronged connector (male portion) 12 on the top and the vertical strap quick release buckle connector (female portion) 35 on the bottom. In contrast, the vertical strap quick release buckle 11 on the second vertical retention strap 40 has the vertical strap quick release buckle pronged connector (male portion) 12 on the bottom and the vertical strap quick release buckle connector (female portion) 35 on the top. Both the first vertical retention strap 30 and the second vertical retention strap 40 can further be adjusted for lengthening and shortening each strap to remove excess slack.

I claim:

1. A hands-free dog control harness for hands-free animal control and restraint while walking, jogging, or running, the hands-free dog control harness comprising:

a belt apparatus and a leg apparatus that work in tandem for hands-free control and restraint, the belt apparatus further comprising;

a waist-mounted belt, the waist-mounted belt having two ends and a waist-belt quick release buckle attached to join the two ends together and to secure the waist-mounted belt around a user's waist; and a waist-belt slider adjuster located on a front left position of the waist-mounted belt to allow for differing sizes and comfort adjustment; and a D-ring leash attachment member attached to a left exterior side and a rear position of the waist-mounted belt; and a first retention strap with a proximal and a distal end and a strap quick release buckle situated near a center portion of the first retention strap, where the first retention strap is attached by the proximal end to the waist-mounted belt at a right front location in a first downward direction, where a first retention strap position in relation to the waist-mounted belt prevents either a clockwise or counter-clockwise rotation of the waist-mounted belt; and a second retention strap with a proximal and a distal end and a strap quick release buckle situated near a center portion of the second retention strap, where the second retention strap is attached by the proximal end to the waist-mounted belt at the right front location in a second downward direction, where a second retention strap position in relation to the waist-mounted belt prevents either the clockwise or counter-clockwise rotation of the waist-mounted belt; and wherein the first retention strap and the second retention strap attach to the waist-mounted belt to form an angular separation between the first retention strap and the second retention strap, wherein the angular separation between the first retention strap and the second retention strap is an angle of between 20 to 60 degrees, wherein the angular separation of the retention straps prevents rotation of the waist-mounted belt; and both the first retention strap and the second retention strap are connected by their respective distal ends to the leg apparatus, the leg apparatus further comprising;

a leg-mounted belt that is configured to be worn on the user's right thigh, the leg-mounted belt having two ends; and a leg-belt quick release buckle attached to the two ends of the leg-mounted belt; and wherein the first retention strap connects near one end of the leg-mounted belt and the second retention strap connects near the other end of the leg-mounted belt such that the first retention strap and the second retention strap connect to the leg-mounted belt on either side of the leg-belt quick release buckle; and wherein the leg-mounted belt has;

a leg-belt slider adjuster attached to the leg-mounted belt at the front right location to allow for differing sizes and comfort adjustment.

2. The hands-free dog control harness set forth in claim 1, wherein the D-ring leash attachment member is attached at a user's 7 to 8 o'clock position at a center width of the waist-mounted belt and is attached to the waist-mounted belt by passing a material through a center of the D-ring leash attachment member and securely attaching the material onto the waist-mounted belt on both sides of the D-ring leash attachment member to limit horizontal or vertical movement of the D-ring leash attachment member; and wherein the first retention strap and the second retention strap are attached to the waist-mounted belt at a user's 1 to 2 o'clock position.

3. The hands-free dog control harness set forth in claim 2, wherein the D-ring leash attachment member material is constructed of a corrosion resistant metal or Acetal polymer plastic.

4. The hands free dog control harness set forth in claim 2, wherein the strap quick release buckle of the first retention strap includes a strap quick release buckle pronged connector and a strap quick release buckle connector, where the strap quick release buckle pronged connector is attached to the center portion of the first retention strap nearer the proximal end, and the strap quick release buckle connector is attached to the center portion of the first retention strap nearer the distal end; and wherein the strap quick release buckle of the second retention strap includes a strap quick release buckle pronged connector and a strap quick release buckle connector, where the strap quick release buckle pronged connector is attached to the center portion of the second retention strap nearer the distal end, and the strap quick release buckle connector is attached to the center portion of the second retention strap nearer the proximal end.

* * * * *